(12) United States Patent
Carreel et al.

(10) Patent No.: US 11,831,730 B2
(45) Date of Patent: Nov. 28, 2023

(54) THIN CLIENT FOR INSTALLING A NETWORK-CONNECTABLE DEVICE

(71) Applicant: WITHINGS, Issy les Moulineaux (FR)

(72) Inventors: Eric Carreel, Meudon (FR); Rachid Saadi, Plaisir (FR); Elias Borchani, La Verriere (FR); Salah Kaci, Kremlin Bicetre (FR)

(73) Assignee: WITHINGS, Issy les Moulineaux (FR)

( * ) Notice: Subject to any disclaimer, the term of this patent is extended or adjusted under 35 U.S.C. 154(b) by 0 days.

(21) Appl. No.: 17/790,555

(22) PCT Filed: Dec. 23, 2020

(86) PCT No.: PCT/EP2020/087796
§ 371 (c)(1),
(2) Date: Jul. 1, 2022

(87) PCT Pub. No.: WO2021/136737
PCT Pub. Date: Jul. 8, 2021

(65) Prior Publication Data
US 2023/0034600 A1 Feb. 2, 2023

(30) Foreign Application Priority Data
Jan. 3, 2020 (EP) .................................... 20150263

(51) Int. Cl.
*H04L 67/00* (2022.01)
*H04W 76/12* (2018.01)

(52) U.S. Cl.
CPC .................... *H04L 67/34* (2013.01)

(58) Field of Classification Search
CPC ...................................................... H04L 67/34
See application file for complete search history.

(56) References Cited

U.S. PATENT DOCUMENTS

| 9,009,805 B1 | 4/2015 | Kirkby et al. |
| 11,275,801 B1 * | 3/2022 | McCracken, Jr. .. G06F 16/2379 |
| | | (Continued) |

OTHER PUBLICATIONS

International Search Report for PCT/EP2020/087796, dated Mar. 16, 2021, 3 pages.
(Continued)

*Primary Examiner* — Kostas J Katsikis
(74) *Attorney, Agent, or Firm* — Pillsbury Winthrop Shaw Pittman LLP

(57) ABSTRACT

The disclosure relates to methods and systems for provisioning a network-connectable device. A communication tunnel is formed for transmitting data between the network-connectable device, a mobile terminal and a remote server. The communication tunnel includes a first link initiated using a webview embedded in an application on the mobile terminal and a second link initiated using a library attached to the webview. The first link connects the mobile terminal with the remote server. The second link connects the network-connectable device with the remote server through the mobile terminal. A data packet indicating that the network-connectable device is ready to be provisioned is received through the communication tunnel. A request for providing provisioning data is sent through the communication tunnel based on the data packet. Provisioning data are transmitted through the communication tunnel in response to sending the request. The network-connectable device is provisioned using the provisioning data.

18 Claims, 2 Drawing Sheets

(56) References Cited

U.S. PATENT DOCUMENTS

| | | | |
|---|---|---|---|
| 2010/0192212 A1* | 7/2010 | Raleigh | H04W 8/20 |
| | | | 726/7 |
| 2015/0156601 A1 | 6/2015 | Donnellan et al. | |
| 2015/0169615 A1* | 6/2015 | Batchu | H04W 4/50 |
| | | | 707/624 |
| 2015/0256391 A1* | 9/2015 | Hardy | H04W 4/50 |
| | | | 709/222 |
| 2015/0360131 A1 | 12/2015 | Tsuchida | |
| 2017/0351866 A1* | 12/2017 | Goh | G06F 21/6209 |
| 2018/0184275 A1* | 6/2018 | Doyijode | G06K 19/0723 |
| 2020/0186427 A1* | 6/2020 | Chunduru Venkata | |
| | | | H04L 9/0877 |

OTHER PUBLICATIONS

Written Opinion of the ISA for PCT/EP2020/087796, dated Mar. 16, 2021, 5 pages.

* cited by examiner

THIN CLIENT FOR INSTALLING A NETWORK-CONNECTABLE DEVICE

CROSS-REFERENCE TO RELATED APPLICATIONS

This application is the U.S. national phase of International Application No. PCT/EP2020/087796 filed Dec. 23, 2020, which designated the U.S. and claims priority to EP Patent Application No. 20150263.0 filed Jan. 3, 2020, the entire contents of each of which are hereby incorporated by reference.

BACKGROUND OF THE INVENTION

Field of the Invention

The present invention generally relates to the telecommunications domain, and more specifically to methods and systems for provisioning network-connectable devices.

Description of the Related Art

It is known to provision network-connectable devices using thick clients comprising provisioning data for installing said devices.

However, such thick clients shall be updated frequently in order to take into account new types of network-connectable devices, to update the provisioning data, and to continuously improve the software stored on said devices.

It is desirable to reduce the file size of clients and also to reduce the need for client updates.

Moreover, third-parties may try and access the contents of a client, in particular in order to get personal information of a user and/or to get technical know-how embedded in the client.

Therefore, there is a need to provide a client for provisioning network-connectable devices, such client having a minimized size, performing minimal manipulations of data and requiring minimal updates.

SUMMARY OF THE INVENTION

The present invention aims at improving the situation.

To this aim, the invention relates to a method for provisioning a network-connectable device, comprising:
  forming a communication tunnel for transmitting data between the network-connectable device, a mobile terminal and a remote server by:
    initiating, using a webview embedded in an application on the mobile terminal, a first communication link between the mobile terminal and the remote server, and
    initiating, using a library attached to the webview and stored on the mobile terminal, a second communication link between the network-connectable device and the remote server through the mobile terminal,
  the first communication link and the second communication link forming the communication tunnel,
  through the communication tunnel, receiving from the network-connectable device a data packet indicating that the network-connectable device is ready to be provisioned,
  through the communication tunnel, sending to the remote server a request for providing provisioning data based on the data packet indicating that the network-connectable device is ready to be provisioned,
  through the communication tunnel, transmitting to the network-connectable device provisioning data for provisioning the network-connectable device in response to sending the request, and
  provisioning the network-connectable device using the provisioning data.

The network-connectable device may be any device equipped with a communication interface for connecting the device to a LAN, WLAN or WAN network. Non-limitative examples of network-connectable devices include smartphones, laptops, computers, tablets, network-connectable body scales, network-connectable monitoring devices for tracking parameters such as health parameters, activity parameters and/or physiological parameters, network-connectable alarm clocks, network-connectable watches, network-connectable home monitoring devices, etc.

Provisioning the network-connectable device involves preparing the network-connectable device with appropriate data and/or software to make it ready for further communication. Said provisioning may involve performing various configuration instructions depending in particular on the connection technology used, and may for example include modem configuration, network authentication, driver installation, identity management, etc. The provisioning data may comprise any instructions to be sent to the network-connectable device for progressing in the method for provisioning the network-connectable device, such as instructions to scan for local networks, network credentials, and/or connection instructions.

The mobile terminal may refer to any kind of portable equipment having a communication interface which may be configured for communicating both with the remote server and with the network connectable device. In order to configure the communication interface as such, the mobile terminal may be further equipped with a processing circuitry comprising a processor connected to a memory and to the communication interface of the mobile terminal, the memory storing a string of instructions, which, when executed by the processor, allow performing the above method. Alternately, the communication interface may be initially configured to communicate with a remote device incorporating such processing circuitry. The mobile terminal may be further equipped with a display for displaying the webview, and the application embedding the webview, to a user. The mobile terminal may be further equipped with a command input device for obtaining input commands from the user. Non-limitative examples of such mobile terminals are smartphones, tablets and laptops.

The first communication link allows the mobile terminal to communicate with the remote server. For example a user may communicate with the remote server using the mobile terminal.

The second communication link allows the mobile terminal to transmit data between the remote server and the network-connectable device in view of provisioning the network-connectable device. The first communication link and the second communication link may be associated, chained or combined to form the communication tunnel. This association, chaining or combination may for example be performed by the remote server.

The method of the invention allows provisioning a network-connectable device using a thin client. In particular, there is no need to store the required provisioning data on a client side. Moreover, the webview allows separating the data exchanges for provisioning the network-connectable device from any other data exchange or data manipulation performed by the application embedding the webview.

These effects are achieved in particular due to the communication tunnel between the network-connectable device to be provisioned and the remote server.

Moreover, since the provisioning data are downloaded from the server instead of being stored, updating the provisioning data is especially simple. Indeed, whenever it is desired to update the provisioning data, the update may be only performed on a server side, without the need to dispatch said update to scattered clients.

The method of the invention may be used for example by a manufacturer of network-connectable devices to enable third party partners to easily provision their network-connectable devices.

A further aspect of the invention relates to a computer program product comprising code instructions to perform the above method, when said instructions are run by a processor.

A further aspect of the invention relates to a mobile terminal configured for provisioning a network-connectable device by:
  forming a communication tunnel for transmitting data between the network-connectable device, the mobile terminal and a remote server by:
    initiating, using a webview embedded in an application on the mobile terminal, a first communication link between the mobile terminal and the remote server, and
    initiating, using a library attached to the webview and stored on the mobile terminal, a second communication link between the network-connectable device and the remote server through the mobile terminal,
    the first communication link and the second communication link forming the communication tunnel,
  through the communication tunnel, receiving from the network-connectable device a data packet indicating that the network-connectable device is ready to be provisioned,
  through the communication tunnel, sending to the remote server a request for providing provisioning data based on the data packet indicating that the network-connectable device is ready to be provisioned,
  through the communication tunnel, transmitting to the network-connectable device provisioning data for provisioning the network-connectable device in response to sending the request, in view of
  provisioning the network-connectable device using the provisioning data.

The features disclosed hereafter are optional features which may be included in some exemplary embodiments.

In an embodiment, the second communication link is of a Bluetooth® type and the library is of a Web Bluetooth® type. In other words, the library is adapted for a Bluetooth® type communication.

Implementing a Bluetooth® type communication is cost-effective compared to other types of communication links, requires a low power consumption, and the risk of interference with another pre-existing communication link is negligible.

In an embodiment, the second communication link is of a Bluetooth® Low Energy type and the library is of a WebBLE type. In other words, the library is adapted for a Bluetooth® Low Energy type communication.

Implementing a Bluetooth® Low Energy type communication link provides a lower power consumption even when compared to other low power technologies. Moreover, modules and chipsets for implementing a Bluetooth® Low Energy type communication link have a lower cost even when compared to other similar technologies. Most importantly, such modules and chipsets are already implemented in most smartphones in the market.

In an embodiment, the first communication link is a secure link based on a cryptographic protocol of a HTTPS type and the second communication link is a secure link based on a cryptographic protocol of a TLS type.

Such secure links allow protecting all data exchanged within the communication tunnel.

In an embodiment, the method further comprises, through the first communication link, sending to the remote server authentication credentials for a user account, and the provisioning data for provisioning the network-connectable device which are received from the remote server are related to the user account.

Therefore, provisioning the network-connectable device may be customized to each user account. In particular, different services may be subscribed to by each user account, different user interface configurations may be selected for each user account . . . .

In an embodiment, the provisioning data comprise instructions to configure the network-connectable device to connect with a local device of a local wireless network, and provisioning the network-connectable device using the provisioning data comprises configuring the network-connectable device to connect with the local device of the local wireless network based on said instructions, and connecting the network-connectable device with the local device.

Therefore, the provisioning data may allow the network-connectable device to connect to a local network.

In an embodiment, provisioning the network-connectable device using the provisioning data may further comprise providing a device identifier of the network-connectable device to the local device.

Therefore, the remote server may associate the network-connectable device to the local network it is connected to, in order to reject further attempts of connecting the network-connectable device to a different local network. Rejecting such attempts allow protecting any private user data that may be generated through a legitimate use of the network-connectable device.

In an embodiment, the method further comprises, subsequent to connecting the network-connectable device with the local device, performing one or more of receiving data from the local device or sending data to the local device.

In an embodiment, the method further comprises establishing a connection between the network-connectable device and a local wireless network based on the local network credentials. Therefore, after provisioning the network-connectable device, it is possible to use for example a WAN connection, implemented by the local device of the local network, as a main communication link between the network-connectable device and the remote server.

In an embodiment, the method further comprises, prior to connecting the network-connectable device with the local device, through the first communication link, sending to the remote server authentication credentials for a user account, and through the first communication link, obtaining an authentication confirmation in response to sending the authentication credentials. Therefore, the remote server may associate the network-connectable device both to the local network it is connected to and to a specific user account, in order to reject both further attempts of connecting the network-connectable device to a different local network and further attempts to use the device for another user account.

Rejecting such attempts allow protecting any private user data that may be generated through a legitimate use of the network-connectable device.

BRIEF DESCRIPTION OF THE DRAWINGS

Other characteristics and advantages of the invention will readily appear from the following description of two of its embodiments, provided as non-limitative examples, and of the accompanying drawings.

DESCRIPTION OF THE PREFERRED EMBODIMENTS

Figure 1:
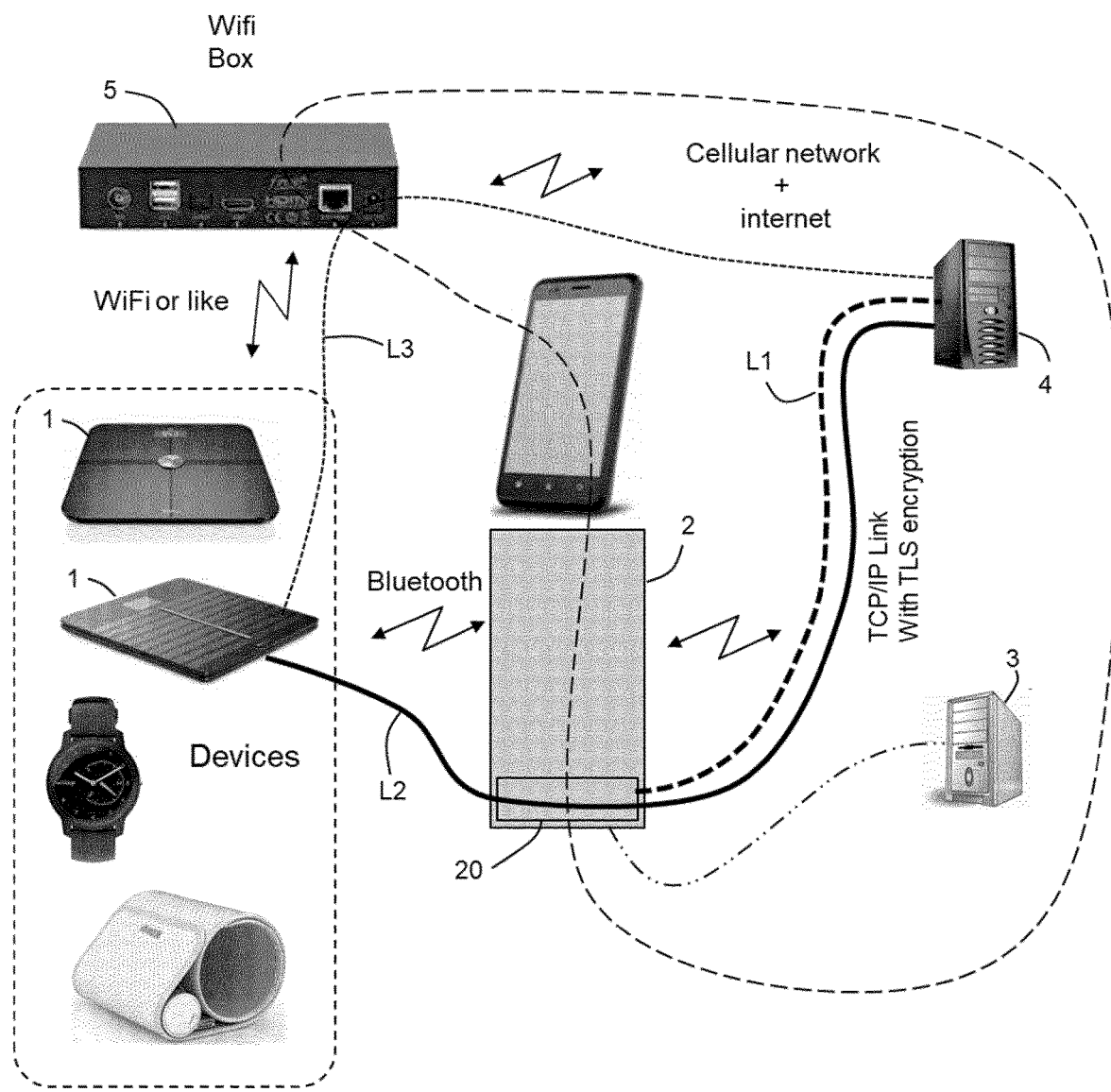
FIG. 1 shows a system in which an exemplary embodiment of the method of the invention can be carried out.

FIG. 1 shows a system comprising a smartphone as an example of a mobile terminal (2) able to communicate, using cellular network and/or WAN, with:
- a smart watch, two smart scales and a blood pressure monitor as examples of network-connectable devices (1),
- a third-party server (3),
- a remote server (4), and
- a network gateway as an example of a local device (5) of a local network.

An application is stored, installed and launched on the smartphone.

The application may consist of several modules.

An example of such a module is a third-party module for exchanging data across a network with the third-party server (3).

The application embeds a webview module in the form of a thin client.

The webview module comprises instructions for opening a webview. The webview module comprises at least one library (20) attached to the webview. A library is considered to correspond to a predefined communication link type. Examples of such communication link types are Wi-Fi®, Bluetooth®, Bluetooth® Low Energy, . . . .

The webview may comprise a user interface displayed on a display of the mobile terminal and configured to receive inputs from a user and to trigger further actions based on said inputs.

Figure 2:
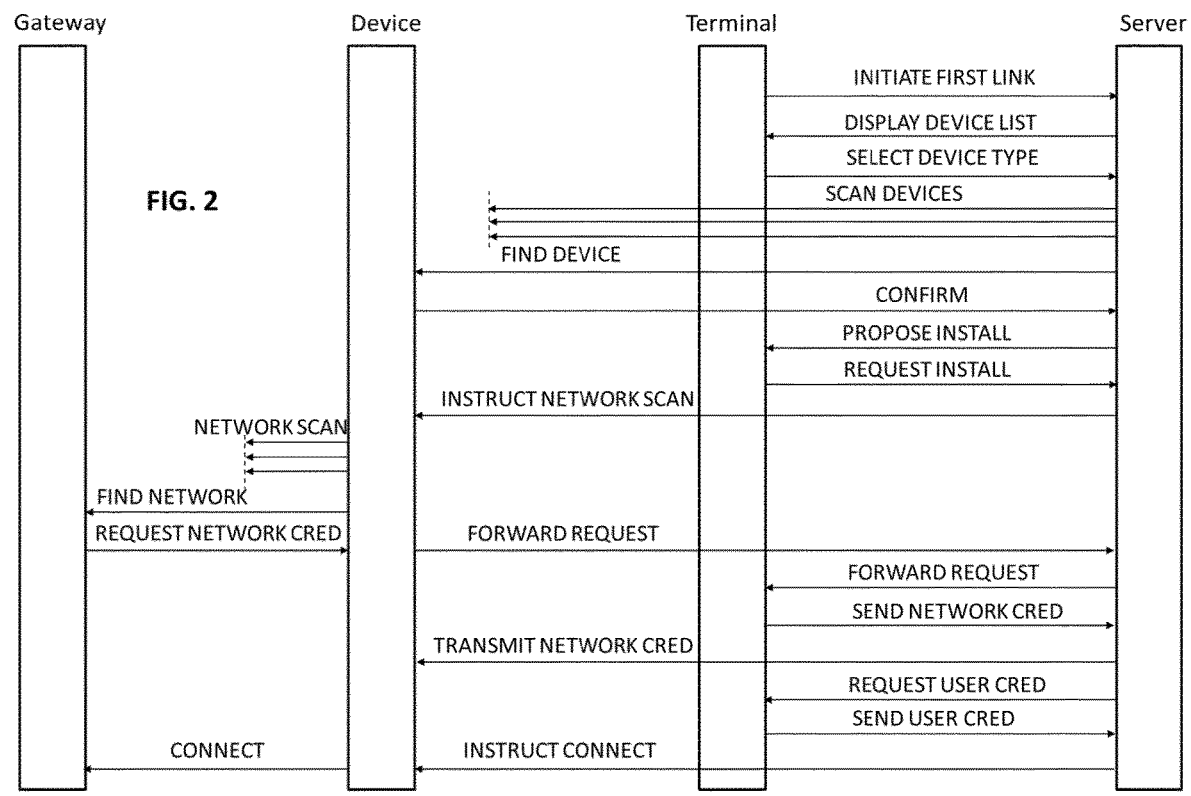
FIG. 2 shows a flow diagram of a general algorithm of a computer program implementing an exemplary embodiment of the method.
Figure 3:
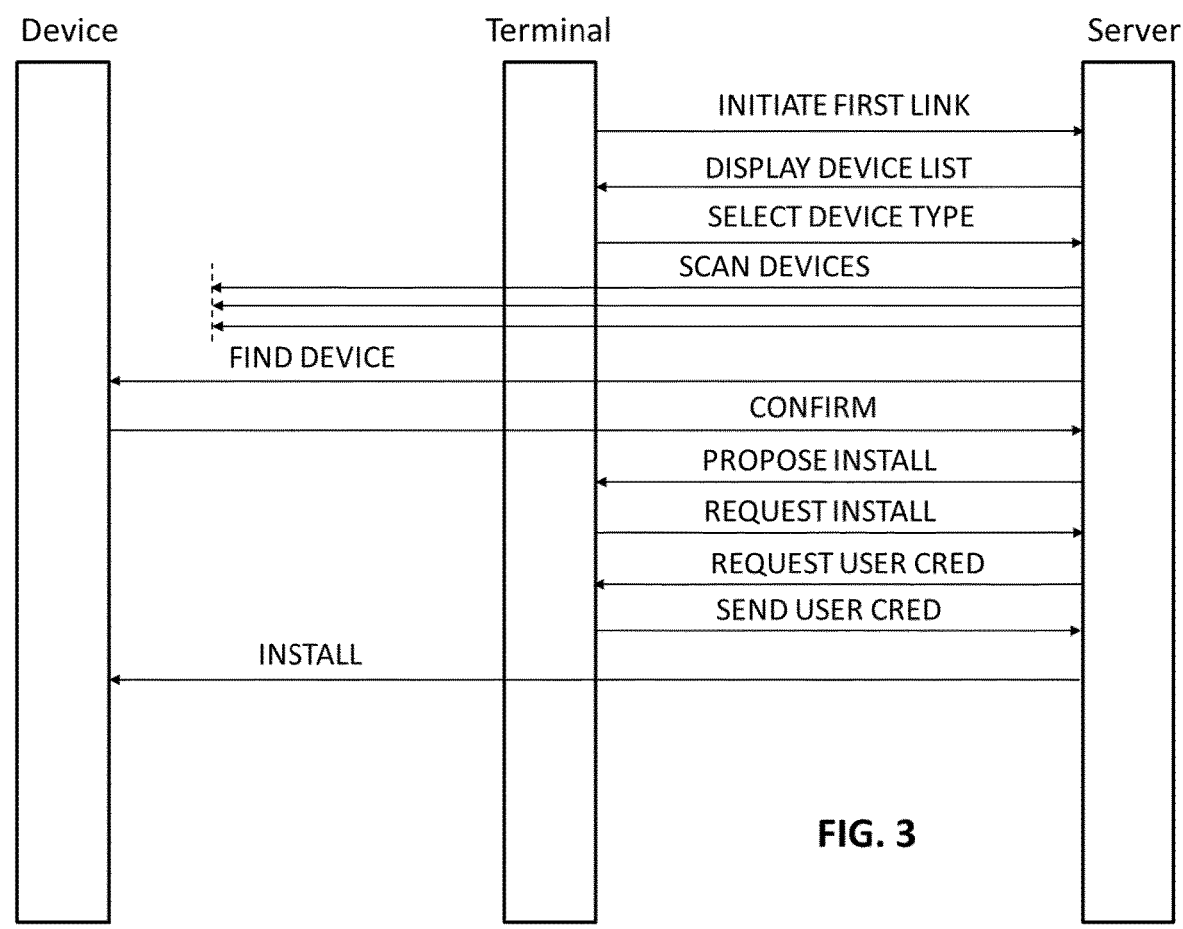
FIG. 3 shows a flow diagram of a general algorithm of a computer program implementing another exemplary embodiment of the method.

Flow diagrams of general algorithms of a computer program implementing exemplary embodiments of the method are shown on FIG. 2 and FIG. 3.

Through the webview, the terminal (2) initiates (INITIATE FIRST LINK) a first communication link (L1) between the terminal (2) and the server (4).

The first communication link (L1) may be initiated for example in response to a user input as described above or may be for example initiated automatically, such as upon launch of the application or upon launch of the webview module.

The first communication link (L1) may for example be based on any known protocol suite such as TCP/IP. The first communication link (L1) may be configured to be impervious to access from any third-party module of the application and from any third-party application on the terminal (2). For example, any communication link type based on end-to-end encryption technologies such as HTTPS encryption and/or based on link encryption technologies may be suitable.

Using the first communication link (L1), the server (4) may provide a list of recognizable or compatible network-connectable device types or subtypes to the terminal (2). By "device type" is understood a category of devices such as "smart watches" or "smart scales". By "device subtype" is understood a subtype of a given category, such as a specific model or version.

In embodiments, the user interface displays (DISPLAY DEVICE LIST) this list to the user on the display of the mobile terminal (2). The user then selects SELECT DEVICE TYPE a target type or subtype of device from said displayed list. The selection is transmitted to the server (4) using the first communication link.

Through the webview, the terminal (2) receives from the server (4) instructions to start scanning SCAN DEVICES for a network-connectable device. Scanning is performed by using said attached library.

If a device type or subtype has been selected, the terminal may specifically scan for a target device of the selected type or subtype. In order to successfully scan said target device, the terminal may select, among a plurality of attached libraries, an attached library of a specific communication link type which is known to be supported by a communication interface equipping the target device.

As a result of the scanning, at least one network-connectable device (1) of the selected type or subtype sends (CONFIRM) a confirmation message back to the terminal (2), which may forward said confirmation message to the server (4) using the webview. An indication that the confirmation message has been received or sent by the terminal may be displayed to the user using the user interface.

The transmission of the confirmation message from the network-connectable device (1) to the terminal (2) and subsequently to the server (4) constitutes a second communication link (L2), distinct from the first communication link (L1).

The second communication link (L2) is of a type corresponding to the library attached to the webview. The second communication link (L2) allows the network-connectable device (1) to communicate with the server (4) through the webview. The second communication link (L2) may be configured such that the exchanged data remain encrypted during their transmission through the webview. For example, any encryption technology such as SSL or TLS encryption may be suitable. Therefore, the terminal (2), and thereby third-parties, cannot access the data generated by the network-connectable device and transmitted to the server (4).

The server subsequently processes said confirmation message. Each processed confirmation message is an indication acknowledging that a target device has been successfully found (FIND DEVICE) and identified, as a result of the scanning.

Once the target device has been successfully found and the confirmation message has been received, the target device may then be provisioned. The available options for provisioning are different depending on the network capabilities of the target device.

In an exemplary embodiment, it is considered that the network wireless capabilities are limited to the following:
- the target network-connectable device (1) may only communicate using Bluetooth® or Bluetooth® Low Energy, the smartphone, as a mobile terminal (2), may communicate using either Wi-Fi®, Bluetooth® or Bluetooth® Low Energy, the gateway, as a local device (5) of a local network, may only communicate using Wi-Fi®.

Therefore, in this exemplary embodiment, it is impossible to provision the target network-connectable device (1) to connect to the gateway.

A flow chart for this exemplary embodiment is shown on FIG. 3.

Based on the processed confirmation message, the server (4) generates and transmits (PROPOSE INSTALL) to the terminal (2), using the first communication link, a proposition for installing the network-connectable device (1). The proposition is displayed using the user interface. The user may accept the proposition through the user input interface and request (REQUEST INSTALL) installation of the network-connectable device (1). The installation request is transmitted from the terminal (2) to the server (4) using the first communication link. Optionally, based on the processed confirmation message, the server (4) may generate and transmit (REQUEST USER CRED) a request for user credentials to the terminal (2), using the first communication link. The request is displayed using the user interface. The user may provide the requested user credentials through the user input interface, such that the terminal (2) transmits (SEND USER CRED) to the server (4) the provided user credentials.

Based on the processed confirmation message and further based, if applicable, on the installation request and/or on the provided user credentials, the server (4) installs (INSTALL) the network-connectable device.

More precisely, the server (4) provides provisioning data to the network-connectable device (1) using the second communication link (L2). Then, based on the provided provisioning data, the network-connectable device (1) provisions an authenticated network connection between itself and a predefined remote server, with the terminal (2) being used as a mere transmission node of the authenticated network connection.

The authenticated network connection being provisioned, it may be used in place of the second communication link (L2), thus bypassing both the webview and the application as a whole.

In an exemplary embodiment, it is considered that the target network-connectable device (1) is equipped with a communication interface, such as a Wi-Fi® interface, able to communicate with the gateway, as a local device (5) of a local network.

A flow chart for this exemplary embodiment, describing how the target network-connectable device (1) may be provisioned to connect to the gateway, is shown on FIG. 2.

Based on the processed confirmation message, the server (4) generates and transmits (INSTRUCT NETWORK SCAN) instructions to the network-connectable device (1), for using its communication interface to scan for surrounding local networks.

Once a network has been found (FIND NETWORK), the local device (5) transmits (REQUEST NETWORK CRED) a request for network credentials back to the network-connectable device (1). The request is forwarded (FORWARD REQUEST) to the server (4) using the second communication link (L2), then to the terminal (2) using the first communication link (L1).

The user interface of the terminal may thus prompt the user to provide (SEND NETWORK CRED) the requested network credentials. Once the requested network credentials have been input by the user, they are transmitted, using the first communication link, to the server (4), which in turn forwards them (TRANSMIT NETWORK CRED) to the network-connectable device (1).

Optionally, the server (4) may generate and transmit (REQUEST USER CRED) a request for user credentials to the terminal (2), using the first communication link (L1). The request is displayed using the user interface. The user may provide the requested user credentials through the user input interface, such that the terminal (2) transmits (SEND USER CRED) to the server (4) the provided user credentials.

Based on the transmitted network credentials and further based, if applicable, on the provided user credentials, the server (4) transmits (INSTRUCT CONNECT) to the network-connectable device (1) instructions to connect to the local device (5) of the local network.

These instructions are an example of provisioning data, which are used by the network-connectable device (1) to provision itself by connecting (CONNECT) to the local device (5) of the local network.

From then, the local network connection (L3) being provisioned, it may be used in place of the second communication link (L2), thus bypassing both the webview, the application and the terminal (2) as a whole.

The invention claimed is:

1. Method performed by a mobile terminal, the method comprising:
    forming a communication tunnel for transmitting data between a network-connectable device, the mobile terminal and a remote server by:
        initiating, using a webview embedded in an application on the mobile terminal, a first communication link between the mobile terminal and the remote server, and
        initiating, using a library attached to the webview and stored on the mobile terminal, a second communication link between the network-connectable device and the remote server through the mobile terminal, wherein the second communication link is configured so that exchanged data between the network-connectable device and the remote server remain encrypted during their transmission through the webview,
        the first communication link and the second communication link forming the communication tunnel,
    through the communication tunnel, receiving from the network-connectable device a data packet indicating that the network-connectable device is ready to be provisioned,
    through the communication tunnel, sending to the remote server a request for providing provisioning data based on the data packet indicating that the network-connectable device is ready to be provisioned,
    through the communication tunnel, transmitting to the network-connectable device provisioning data from the remote server for provisioning the network-connectable device in response to sending the request, in view of provisioning the network-connectable device using the provisioning data.

2. The method according to claim 1, wherein the second communication link is of a Bluetooth® type and the library is of a Web Bluetooth® type.

3. The method according to claim 2, wherein the provisioning data comprise instructions to configure the network-connectable device to connect with a local device of a local wireless network, and provisioning the network-connectable device using the provisioning data comprises:

configuring the network-connectable device to connect with the local device of the local wireless network based on said instructions, and
connecting the network-connectable device with the local device.

4. The method according to claim 2, further comprising:
through the first communication link, sending to the remote server authentication credentials for a user account, and wherein
the provisioning data for provisioning the network-connectable device which are received from the remote server are related to the user account.

5. The method according to claim 2, wherein:
the first communication link is a secure link based on a cryptographic protocol of a HTTPS type and the second communication link is a secure link based on a cryptographic protocol of a TLS type.

6. The method according to claim 1, wherein the provisioning data comprise instructions to configure the network-connectable device to connect with a local device of a local wireless network, and provisioning the network-connectable device using the provisioning data comprises:
configuring the network-connectable device to connect with the local device of the local wireless network based on said instructions, and
connecting the network-connectable device with the local device.

7. The method according to claim 6, wherein provisioning the network-connectable device using the provisioning data further comprises:
providing a device identifier of the network-connectable device to the local device.

8. The method according to the preceding claim 7, further comprising:
subsequent to connecting the network-connectable device with the local device performing one or more of receiving data from the local device or sending data to the local device.

9. The method according to claim 6, further comprising, prior to connecting the network-connectable device with the local device
through the first communication link, sending to the remote server authentication credentials for a user account, and
through the first communication link, obtaining an authentication confirmation in response to sending the authentication credentials.

10. The method according to claim 1, further comprising establishing a connection between the network-connectable device and a local wireless network based on local network credentials.

11. The method according to claim 1, wherein the second communication link is of a Bluetooth® Low Energy type and the library is of a WebBLE type.

12. The method according to claim 11, wherein:
the first communication link is a secure link based on a cryptographic protocol of a HTTPS type and the second communication link is a secure link based on a cryptographic protocol of a TLS type.

13. The method according to claim 11, further comprising:
through the first communication link, sending to the remote server authentication credentials for a user account, and wherein
the provisioning data for provisioning the network-connectable device which are received from the remote server are related to the user account.

14. The method according to claim 1, wherein:
the first communication link is a secure link based on a cryptographic protocol of a HTTPS type and the second communication link is a secure link based on a cryptographic protocol of a TLS type.

15. The method according to claim 14, further comprising:
through the first communication link, sending to the remote server authentication credentials for a user account, and wherein
the provisioning data for provisioning the network-connectable device which are received from the remote server are related to the user account.

16. The method according to claim 1, further comprising:
through the first communication link, sending to the remote server authentication credentials for a user account, and wherein
the provisioning data for provisioning the network-connectable device which are received from the remote server are related to the user account.

17. Non-transitory computer-readable medium for a mobile terminal, the medium comprising code instructions, which, when run by a processor, perform a method comprising:
forming a communication tunnel for transmitting data between a network-connectable device, the mobile terminal and a remote server by:
initiating, using a webview embedded in an application on the mobile terminal, a first communication link between the mobile terminal and the remote server, and
initiating, using a library attached to the webview and stored on the mobile terminal, a second communication link between the network-connectable device and the remote server through the mobile terminal, wherein the second communication link is configured so that exchanged data between the network-connectable device and the remote server remain encrypted during their transmission through the webview,
the first communication link and the second communication link forming the communication tunnel,
through the communication tunnel, receiving from the network-connectable device a data packet indicating that the network-connectable device is ready to be provisioned,
through the communication tunnel, sending to the remote server a request for providing provisioning data based on the data packet indicating that the network-connectable device is ready to be provisioned,
through the communication tunnel, transmitting to the network-connectable device provisioning data from the remote server for provisioning the network-connectable device in response to sending the request, in view of provisioning the network-connectable device using the provisioning data.

18. Mobile terminal comprising processing circuitry with a processor connected to a memory to perform a method comprising:
forming a communication tunnel for transmitting data between a network-connectable device the mobile terminal and a remote server by:
initiating, using a webview embedded in an application on the mobile terminal a first communication link between the mobile terminal and the remote server, and initiating, using a library attached to the webview and stored on the mobile terminal, a second communication link between the network-connectable device and the remote server through the mobile terminal, wherein the second communication link is configured so that exchanged data between the network-connectable device and the remote server remain encrypted during their transmission through the webview, the first communication link and the second communication link forming the communication tunnel, through the communication tunnel, receiving from the network-connectable device a data packet indicating that the network-connectable device is ready to be provisioned, through the communication tunnel, sending to the remote server a request for providing provisioning data based on the data packet indicating that the network-connectable device is ready to be provisioned, through the communication tunnel, transmitting to the network-connectable device provisioning data from the remote server for provisioning the network-connectable device in response to sending the request, in view of Provisioning the network-connectable device using the provisioning data.

\* \* \* \* \*